United States Patent [19]

Blum et al.

[11] Patent Number: 4,845,147

[45] Date of Patent: Jul. 4, 1989

[54] NONAQUEOUS POLYMER DISPERSIONS

[75] Inventors: Rainer Blum, Ludwigshafen; Gerd Rehmer, Bobenheim-Roxheim; Rolf Osterloh, Erftstadt; Hans Sander, Ludwigshafen, all of Fed. Rep. of Germany

[73] Assignee: BASF Aktiengesellschaft, Ludwigshafen, Fed. Rep. of Germany

[21] Appl. No.: 176,764

[22] Filed: Apr. 1, 1988

[30] Foreign Application Priority Data

Apr. 9, 1987 [DE] Fed. Rep. of Germany ....... 3712015

[51] Int. Cl.$^4$ ............................................ C08K 3/20
[52] U.S. Cl. .................................. 524/461; 526/201; 526/203
[58] Field of Search .................. 524/461; 526/201, 203

[56] References Cited

U.S. PATENT DOCUMENTS

| | | | |
|---|---|---|---|
| 3,397,166 | 8/1968 | Schmidle et al. | 524/461 |
| 3,405,087 | 10/1968 | Fryd | 524/461 |
| 3,666,710 | 5/1972 | Makhlouf et al. | 524/461 |
| 3,793,245 | 2/1974 | Clarke et al. | 524/461 |
| 3,956,225 | 5/1976 | Murato et al. | 524/461 |
| 3,981,839 | 9/1976 | Asher et al. | 524/460 |
| 4,059,557 | 11/1977 | Bentley et al. | 524/461 |
| 4,087,393 | 5/1978 | Tsubuko et al. | 524/461 |
| 4,525,499 | 6/1985 | Hayashi et al. | 524/461 |
| 4,616,058 | 10/1986 | Yabuta et al. | 524/461 |

FOREIGN PATENT DOCUMENTS

0686208 5/1964 Canada .............................. 524/461

OTHER PUBLICATIONS

Y. Sasaki and M. Yabuta, Advances in the Syntheses and Film Performance of Non-Aqueous Polymer Dispersions, Organic Coating, Japan, 8/1986, pp. 163–281.

*Primary Examiner*—Joseph L. Schofer
*Assistant Examiner*—J. M. Reddick
*Attorney, Agent, or Firm*—Keil & Weinkauf

[57] ABSTRACT

Nonaqueous polymer dispersions are obtainable by polymerization of esters (A) of acrylic acid and/or methacrylic acid and/or ethylacrylic acid with $C_1$–$C_{20}$-alcohols in an organic solvent or a mixture of organic solvents in which the polymers formed are insoluble, and in the presence of copolymers (B) having a molecular weight of from 500 to 20,000 and obtainable by bulk or solution polymerization of monoolefinically unsaturated monomers at from 180° to 400° C. and from 1 to 200 bar, and the said dispersions are used for the production of finishes, coating materials and adhesives.

6 Claims, No Drawings

NONAQUEOUS POLYMER DISPERSIONS

The present invention relates to nonaqueous polymer dispersions obtainable by polymerization of esters (A) of acrylic acid and/or methacrylic acid and/or ethylacrylic acid with $C_1$–$C_{20}$-alcohols in an organic solvent or a mixture of organic solvents in which the polymers formed are insoluble, and in the presence of copolymers (B) having a molecular weight of from 500 to 20,000 obtainable by bulk or solution polymerization of monoolefinically unsaturated monomers at from 180° to 40° C. and under from 1 to 200 bar, and the use of these dispersions for the preparation of finishes, coating materials and adhesives.

Nonaqueous polymer dispersions (NAD) have long been known and are described, for example, by Y. Sasaki and M. Yabuta in the review article Advances in the synthesis and film performance of non-aqueous polymer dispersions, in Hiratsuka, Organic Coating, Japan, Part 8/1986, pages 263–281. The NADs made it possible to transfer the molecular weight-independence of the viscosity, which is known to be a property of aqueous dispersions, to organic coatings.

For NADs, it is important that the compositions are insoluble in the solvent chosen. In the prior art, the formation simply of precipitation polymers or polymer/solvent mixtures which separate in layers is avoided by the use of suitable dispersants. The phase boundary-forming assistants stabilized the particles in such a way that perfect gloss and leveling are not achieved during coating; it is for this reason that NADs have not as yet become established, in particular for automotive finishes.

It is an object of the present invention to provide nonaqueous dispersions which have a long shelf life even without dispersants and give films having very good gloss and leveling properties.

We have found that this object is achieved by nonaqueous polymer dispersions obtainable by polymerization of esters (A) of acrylic acid and/or methacrylic acid and/or ethylacrylic acid with $C_1$–$C_{20}$-alcohols in an organic solvent or a mixture of organic solvents in which the polymers formed are insoluble and in the presence of copolymers (B) having a molecular weight of from 500 to 20,000 and obtainable by bulk or solution polymerization of monoolefinically unsaturated monomers at from 180° to 400° C. and under from 1 to 200 bar.

Components (A) which may be used are esters of acrylic acid, methacrylic acid or ethylacrylic acid with aliphatic $C_1$–$C_{20}$-alcohols, preferably $C_1$–$C_8$-alcohols, such as methyl acrylate, methyl methacrylate, methyl ethacrylate, ethyl acrylate, ethyl methacrylate, propyl acrylate, propyl methacrylate, n-butyl acrylate, sec-butyl acrylate, isobutyl acrylate, tert-butyl acrylate, n-butyl methacrylate, sec-butyl methacrylate, isobutyl methacrylate, tert-butyl methacrylate, n-butyl ethacrylate, 2-ethyl-hexyl acrylate, 2-ethyhexyl methacrylate, lauryl acrylate, lauryl methacrylate, octadecyl acrylate, octadecyl methacrylate, methylglycol acrylate, methylglycol methacrylate, ethylglycol acrylate, ethylglycol methacrylate, n-propyl-glycol acrylate, n-propylglycol methacrylate, isopropyl-glycol acrylate, isopropylglycol methacrylate, n-butyl-glycol acrylate, n-butylglycol methacrylate, sec-butyl-glycol acrylate, isobutylglycol acrylate, tert-butylglycol acrylate, sec-butylglycol methacrylate, isobutylglycol methacrylate and tert-butylglycol methacrylate, and with cycloaliphatic $C_6$–$C_{20}$-alcohols, preferably $C_6$–$C_{10}$-alcohols, such as cyclohexyl acrylate, cyclohexyl methacrylate, 4-tert-butylcyclohexyl 1-acrylate, 2-decalyl acrylate and tetrahydrofurfuryl acrylate, and with aromatic $C_6$–$C_{20}$-alcohols, such as phenyl acrylate, phenyl methacrylate and anisyl acrylate, and with araliphatic $C_7$–$C_{20}$-alcohols, such as benzyl acrylate, benzyl methacrylate, β-phenylethyl acrylate and β-phenoxyethyl acrylate.

Monoesters of acrylic acid, methacrylic acid or ethylacrylic acid with dihydric to hexahydric $C_2$–$C_{18}$-alcohols, preferably $C_2$–$C_8$-alcohols, are also suitable, for example β-hydroxyethyl acrylate, β-hydroxyethyl methacrylate, propylene glycol monoacrylate, propylene glycol monomethacrylate, butane-1,4-diol monoacrylate, butane-1,4-diol monomethacrylate, pentane-1,5-diol monoacrylate, pentane-1,5-diol monomethacrylate, hexane-1,6-diol monoacrylate, hexane-1,6-diol monomethacrylate, glycerol monoacrylate, glycerol monomethacrylate, trimethylolpropane monoacrylate, trimethylolpropane monomethacrylate, pentaerythritol monoacrylate, pentaerythritol monomethacrylate, 1,4-cyclohexanedimethanol monoacrylate and 1,4-cyclohexanedimethanol monomethacrylate.

Methyl methacrylate, n-butyl acrylate, n-butyl methacrylate, tert-butyl acrylate, tert-butyl methacrylate, isobutyl acrylate, isobutyl methacrylate, ethylhexyl acrylate, ethylhexyl methacrylate and hydroxyethyl acrylate are preferably used.

The component (A) is used in an amount of from 30 to 95, preferably from 50 to 80, % by weight.

Suitable components for the preparation of the copolymers (B) are vinylaromatics, such as styrene, α-methylstyrene, chlorostyrene, vinyltoluene and tert-butylstyrene, acrylic acid, methacrylic acid, ethylacrylic acid and esters of these acids with $C_1$–$C_{20}$-alcohols, as described, for example, for component (A), monoesters of these acids with dihydric to hexahydric alcohols, as described, for example, for component (A), maleic acid, fumaric acid and their $C_1$–$C_4$-mono- and -dialkyl esters, acrylonitrile, methacrylonitrile, acrylamidomethylol ether, methacrylamidomethylol ether, acrylamide, methacrylamide, glycidyl acrylate and glycidyl methacrylate, vinyl esters of $C_2$–$C_4$-carboxylic acids, such as vinyl acetate amd vinyl propionate, and vinyl ethers of 3 to 10 carbon atoms, vinyl halides such as vinyl chloride and vinylidene chloride, and polyolefinically unsaturated compounds, such as butadiene and isoprene.

Preferred monomers are styrene, acrylic acid, methacrylic acid, methyl methacrylate, butyl acrylate, tert-butyl acrylate, tert-butyl methacrylate and 2-ethylhexyl acrylate.

Component (B) is prepared by known methods of bulk polymerization or solution polymerization, as described in, for example, German Laid-Open Application DOS 3,225,875, at from 180° to 400° C., preferably from 200° to 350° C., particularly preferably from 200° to 300° C., under from 1 to 200, preferably from 20 to 50, bar in the presence or absence of a high boiling solvent, such as a mixture of aromatics having a boiling range from 155° to 185° C. or an aromatics/aliphatics/cycloaliphatics mixture having a boiling range from 120° to 250° C., and in the presence or absence of polymerization initiators and regulators. The copolymers (B) have mean molecular weights (number average) of from 500 to 20,000, preferably from 1,000 to 10,000, and hydrogenation iodine numbers (DIN 53,241) of from 1.3 to 51, preferably from 2.5 to 25.4.

In the preparation of the NADs, the copolymer is generally dissolved in the other monomers before the reaction. It may be dissolved in the solvent used for the polymerization or in one of the monomers or the monomer mixture.

Component (B) is used in amounts of from 5 to 70, preferably 20 to 50, % by weight.

Suitable components (C) are styrene, α-methylstyrene, chlorostyrene, vinyltoluene, tert-butylstyrene, acrylamidomethylol ether, methacrylamidomethylol ether, acrylic acid, methacrylic acid and ethylacrylic acid, as well as maleic acid, fumaric acid and their $C_1$-$C_4$-mono- and -dialkyl esters, maleic anhydride, acrylonitrile, acrylamide and methacrylamide, these compounds being present in amounts of from 0 to 50% by weight. Where they are present, amounts of from 5 to 50, preferably from 10 to 40, % by weight have proven useful.

The NADs are prepared by known polymerization methods, preferably in a solvent such as a mixture of aromatics having a boiling range of from 120° to 250° C. or an aromatics/aliphatics/cycloaliphatics mixture having a boiling range of from 120° to 250° C., at from 60° to 180° C., preferably from 140° to 160° C., under from atmospheric pressure to 10 bar, using a polymerization initiator such as cumene hydroperoxide, tert-butyl perbenzoate or benzoyl peroxide and, if required, a regulator such as dodecyl mercaptan or mercaptoethanol.

Other solvents are also suitable for forming the outer phase of the NADs, for example alcohols, esters, ethers, ketones, glycol ethers, etc. It is not intended to restrict the application of the invention by stating these solvents. The criterion for choice is that the copolymers formed are insoluble in the solvent chosen, and that the boiling point and the evaporation behavior are adapted to the desired coating application. Using mixtures of solvents of different polarities, it is possible to formulate coatings which, in the application form, have a low viscosity coupled with very little thixotropic behaviour. When the polar, low boiling solvents are evaporated, the viscosity increase and the coatings become thixotropic. This combined effect through a change in polarity and a change in thixotropic properties makes it possible to develop coatings having optimum rheology.

The NADs can also be prepared by a two-stage procedure, by first preparing the component (b) in a solvent or solvent mixture and then copolymerizing the components (A) and (C) in the presence of the said component (B).

The NADs may be uncrosslinked or crosslinked in the disperse phase, depending on the comonomers used. Crosslinking occurs in general where, for example, glycidyl acrylate, glycidyl methacrylate and acrylamidomethylol ether are used as comonomers.

The NADs generally have a solids content of 50 to 80, preferably from 70 to 80, % by weight and viscosities from 1,000 to 3,000 mPa.s (20° C.).

The dispersant-free NADs are formed spontaneously, have a long shelf life and, after application to substrates of metal, glass, wood and plastic, give films having very good gloss and leveling properties.

The NADs can be combined with coating polyisocyanates, polyurethane resins, aminoplast resins and epoxy resins, with or without suitable catalysts and assistants, to give finishes, coating materials and adhesives, in particular metallic-effect top coats.

| | Example 1 | Example 2 (Comparative Example) |
|---|---|---|
| Feed I: | | |
| butyl acrylate | 300 g | 300 g |
| tert-butyl acrylate | 300 g | 300 g |
| hydroxyethyl acrylate | 200 g | 200 g |
| styrene | — | 168 g |
| methacrylic acid | — | 32 g |
| *(dissolved in the other components of feed 1) | 200 g | — |
| Feed II: | | |
| tert-butyl perbenzoate Feed I: | 40 g | 40 g |
| Feed III: | | |
| tert-butyl perbenzoate | 10 g | 10 g |
| Initially taken components: gasoline boiling range 155–185° C., (aromatics content about 20%) | 350 g | 350 g |

* = Copolymer (B) which was prepared from 84% by weight of styrene and 16% by weight of methacrylic acid and had a mean molecular weight of 2,950

The mixture initially introduced into a reaction vessel was heated to 160° C. and feeds I and II were added in the course of 2 hours, the temperature being from 152° to 163° C. Stirring was continued for 1 hour at 160°–163° C., after which feed III was added in the course of 1 hour and polymerization was continued for a further hour.

EXAMPLE 3

A two-stage polymerization was carried out in a reaction vessel equipped with pressure feed vessels.

Stage 1: Preparation of the copolymer (B)

Initially taken component: 750 g of gasoline (aromatics content 20%), boiling range 155°–185° C.

Feed I: 336 g of styrene, 64 g of methacrylic acid, 20 g of cumene hydroperoxide.

The initially taken mixture was heated to 270° C. under nitrogen, the pressure reaching 3.7 bar; feed I was forced in over 30 minutes, the pressure increasing to 5.4 bar during this procedure. Polymerization was continued for 30 minutes, after which the temperature was decreased to 150° C. and the residual pressure of 0.8 bar was let down via a cooled reflux condenser.

Stage 2: Preparation of the NAD

Feed II: 600 g of butyl acrylate, 600 g of tert-butyl acrylate, 400 g of hydroxymethyl acrylate, 60 g of tert-butyl perbenzoate.

Feed III: 20 g of tert-butyl perbenzoate.

Feed II was added in the course of 2 hours to stage 1, which had been cooled to 150° C., and feed III was added after a further hour, in the course of 30 minutes, after which polymerization was continued for a further hour and the mixture was cooled.

Characteristic data of the polymer solutions

| | Example 1 | Example 2 (Comparison) | Example 3 |
|---|---|---|---|
| Viscosity (mPa.s) (20° C., D: 5 s$^{-1}$) | 2,400 | 40,000 | 1,740 |
| Efflux time, cup 4 (DIN 53,211) | 183" | Not measurable, too viscous | 99" |
| Nonvolatile components (DIN 53,216) | 75% | 75% | 75% |

|  | Example 1 | Example 2 (Comparison) | Example 3 |
|---|---|---|---|
| K value (cf. DIN 53,720) 3% strength in acetone | 12.5 | 11.8 | 11.0 |
| Appearance | Cloudy | Clear | White and cloudy |

Testing the polymer solutions

Clear coats such as that used as top coats for metallic-effect builds in automotive construction were formulated from polymer solutions according to Examples 1 and 2.

To test the running behavior, films of increasing thickness were applied by means of a knife coater to metal sheets measuring 6 cm×25 cm, dried in a horizontal position in the air at room temperature for 10 minutes and then baked for 30 minutes at 140° C. while suspended vertically from the narrow edge. The dry film thickness at which running was still not detectable was stated.

|  | Coat 1 | Coat 2 | Coat 3 | Coat 4 | Coat 5 | Coat 6 |
|---|---|---|---|---|---|---|
| Polymer solution according to Example | 1 | 1 | 1 | 2 | 2 | 2 |
| Amount of polymer solution | 87 | 87 | 87 | 87 | 87 | 87 |
| Melamine/formaldehyde resin etherified with isobutanol, highly heat-reactive | 64 | 64 | 64 | 64 | 64 | 64 |
| Benzylamine | — | 2 | 2 | — | 2 | 2 |
| Hexamethylenediamine | — | — | 0.5 | — | — | 0.5 |
| Efflux time D 4 (before addition of propanol) | 258" | 315" | 346" | 510" | 680" | >700" |
| Propanol | 45 | 45 | 45 | 45 | 45 | 45 |
| Efflux time D 6 (after addition of propanol) | 47" | 55" | 62" | 126" | 214" | 226" |
| Run-free dry film thickness [μm] | 55 | 63 | 72 | 25 | 42 | 42 |
| Pendulum damping (DIN 53,157) at 40 μm | 146 | 146 | 143 | 151 | 148 | 152 |
| Identation (DIN 53,156) | 7.4 | 7.0 | 8.1 | 6.4 | 6.2 | 7.2 |
| Crosshatch test (DIN 53,151) | 1 | 1 | 1 | 1 | 2 | 1 |

The polymer solutions according to Examples 1, 2 and 3 were mixed in a ratio of 65:35 with a melamine/-formaldehyde resin (etherified with isobutanol, highly heat-reactive) and brought to a solids content of 55% by weight with isobutanol/xylene. The solutions were applied to degreased steel sheets using a knife coater having a 100 μm gap and were baked for 30 minutes at 140° C.

|  | Example 1 | Example 2 (Comparison) | Example 3 |
|---|---|---|---|
| Efflux time of the 55% strength by weight solution Cup 4 (DIN 53,211) | 36" | 219" | 28" |
| Indentation (DIN 53,156) | 10 | 4.3 | 6.7 |
| Pendulum damping (DIN 53,157) | 138" | 112" | 146" |
| Crosshatch test (DIN 53,151) | 0 | 3 | 1 |

We claim:

1. A nonaqueous polymer dispersion obtainable by polymerization of esters (A) of acrylic acid or methacrylic acid or ethylacrylic acid, or a mixture of these, with $C_1-C_{20}$-alcohols in an organic solvent or a mixture of organic solvents in which the polymers formed are insoluble and in the presence of copolymer (B) having a molecular weight of from 500 to 20,000 and obtainable by bulk or solution polymerization of at least two of the monomers, selected from the group consisting of vinylaromatics, acrylic acid, methacrylic acid, ethylacrylic acid, esters of these acids with $C_1-C_{20}$-alcohols, monoesters of these acids with dihydric to hexahydric alcohols, maleic acid, maleic anhydride, fumaric acid, their $C_1-C_4$-mono- and -dialkyl esters, acrylonitrile, methacrylonitrile, acrylamidomethylol ether, methacrylamidomethylol ether, acrylamide, methacrylamide, glycidyl acrylate and glycidyl methacrylate, vinyl esters of $C_2-C_4$-carboxylic acids, vinyl ethers of 3 to 10 carbon atoms, vinyl halides, butadiene and isoprene at from 180° to 400° C. and under from 1 to 200 bar.

2. A nonaqueous polymer dispersion as defined in claim 1, obtainable by polymerization of 30 to 95% by weight of esters (A) in the presence of from 5 to 70% by weight of copolymer (B).

3. A nonaqueous polymer dispersion as claimed in claim 1, obtainable by copolymerization of from 30 to 90% by weight of esters (A) with from 5 to 50% by weight of at least one monomer selected from the group consisting of styrene, α-methylstyrene, chlorostyrene, vinyltoluene, tert-butylstyrene, acrylic acid, methacrylic acid, maleic acid, maleic anhydride, maleates, acrylonitrile, methacrylamide, acrylamide, acrylamidoalkylol ethers and methacrylamidoalkylol ethers in the presence of from 5 to 70% by weight of copolymer (B).

4. A nonaqueous polymer dispersion as defined in claim 1, obtainable using a monoester of acrylic acid or methacrylic acid or ethylacrylic acid or monoesters of a mixture of these acids, with a monohydric to hexahydric aliphatic, cycloaliphatic or aromatic alcohol, or a mixture of such alcohols, as component (A).

5. A nonaqueous polymer dispersion as defined in claim 1, obtainable using predominant proportions of styrene and minor proportions of acrylic acid, methacrylic acid, maleic acid, maleic anhydride and esters of the stated acids with $C_1-C_{20}$-alcohols as components of the copolymers (B).

6. A nonaqueous polymer dispersion as defined in alcim 1, obtained by using predominant proportions of styrene and minor proportions of acrylic acid or methacrylic acid or mixtures thereof as components of the copolymers (B).

* * * * *